Patented Mar. 18, 1952

2,589,867

UNITED STATES PATENT OFFICE 2,589,867

PROCESS FOR RECOVERY OF VEGETABLE PROTEIN

Stewart Rowe, Cincinnati, Ohio, assignor, by mesne assignments, to Buckeye Cotton Oil Company, Memphis, Tenn., a corporation of Ohio No Drawing. Application July 8, 1949, Serial No. 103,760

11 Claims. (Cl. 260—123.5)

This invention relates to improvements in the process of recovering protein from oleaginous seed material and to protein of improved properties obtained thereby.

A conventional method of recovering protein from oleaginous seed material is to reduce the seed to flake or meal form, to extract the oil therefrom with an oil solvent such as petroleum ether, to treat the substantially oil-free material with aqueous alkali in order to dissolve the protein, to screen out insoluble matter, to acidify the aqueous solution of protein to about the isoelectric point thereof, thereby precipitating the protein, to separate the precipitated protein from the liquor by settling, filtering, centrifuging or otherwise, and finally to granulate and dry the protein. Many variations of such conventional procedures may be practiced. Thus the extraction of the protein may, if desired, be preceded by washing the meal with water at the isoelectric point of the protein in order to eliminate undesired soluble constituents; lime may be used in the alkaline extract in order to aid in purification; under the influence of lime and/or other alkali, partial hydrolysis of the protein may be effected prior to precipitation thereof, thus altering its solubility and other properties; small amounts of sodium sulfite or sodium bisulfite are sometimes used in order to improve the color of the product and to suppress bacterial growth, which is often troublesome in grain mashes, or alternatively, sulfurous acid or sulfur dioxide may be used either alone or in conjunction with other acids in the precipitation step. The use of sulfites, bisulfites, sulfurous acid or sulfur dioxide, however, partially denatures the protein, making it more difficult to dissolve unless hydrolyzed by alkali.

By conventional methods such as these, seed protein such as that of soybeans can be obtained which is suitable for many purposes. For other purposes, however, it is desirable to have a product which dissolves more readily and/or gives less viscous solutions when dissolved. Furthermore, such protein produced by ordinary processes, without hydrolysis, is sensitive to both heat and moisture, becoming on aging progressively more difficult to dissolve and producing solutions which become highly viscous or even form gels at relatively low concentrations. Even in the normal drying operation in the conventional manufacturing process, some denaturation of this sort takes place.

It is an object of my invention to provide a protein which dissolves rapidly in dilute aqueous alkali. Another object is to provide a protein which gives solutions of reduced viscosity and with reduced tendency to gel even at high concentrations. Another object is to provide a protein having these desirable properties without resorting to prolonged alkaline hydrolysis with its expense, delay and increased problem of bacterial contamination. Another object is to improve the process of recovering protein from soybeans and other oleaginous seed material. Other objects will appear in the description which follows.

I have found that protein of improved solution properties, by which I mean increased rate of solution in dilute aqueous alkali and/or decreased viscosity of the solution in dilute aqueous alkali, can be obtained according to conventional processes for recovering protein from oleaginous seed material such as soybeans, by suitably contacting the protein with any acid-soluble compound which in solution furnishes cupric or mercuric ions, such for example as cupric nitrate, cupric sulfate, cupric chloride, mercuric acetate or mercuric chloride. While I prefer to use cupric or mercuric salts which are freely soluble in water, I find that even slightly soluble compounds, such for example as cupric oxide or cupric hydroxide, may also be used for my purpose, provided they are soluble in the acid of the precipitation step, and when I speak herein of acid-soluble compounds I mean those which are soluble in the acid which is to be used for precipitating the protein from its alkaline solution or in the acidified system containing the protein.

The cupric and mercuric compounds, which I shall for convenience refer to as my heavy metal compounds, are added to the protein-containing system either singly or in mixtures, either dry, or as hydrates, or as aqueous suspensions, or as aqueous solutions. By the term "protein-containing system" I mean to include the soybean or other oleaginous seed material before the alkali-soluble protein has been extracted therefrom, as well as the aqueous alkaline solution of the protein and the acidified solution containing precipitated protein. To accomplish my objects, the protein-containing system should be contacted with my heavy metal compounds in an aqueous environment such that cupric or mercuric ions are formed, and for this reason the presence of ions such as ammonium and the like which form complexes with copper or mercury ions is undesirable.

My heavy metal compounds can be contacted with the protein-containing system at various stages in the process of protein recovery. For example, soybean material (preferably in comminuted form such as flakes or meal to facilitate contact) can be slurried in water containing my heavy metal compounds, and to this slurry alkali can be added to extract the protein therefrom. Among permissible variations in procedure, obvious to one skilled in the art, are to add my heavy metal compounds to the aqueous alkali which is to be used for extracting protein from the soybean material, or to add them to the aqueous alkaline solution of the protein after the extraction has been effected. In both cases, hydroxides or oxides may be precipitated, but these will be dissolved in the subsequent acidification step. Alternatively, my heavy metal compounds can be added to the protein-containing system simultaneously with the precipitating acid, either separately or dissolved therein.

My heavy metal compounds can even be added to the slurry of freshly precipitated protein. However, after precipitation a slow change with time takes place in the nature of the precipitate, which change I think to be one of physical structure and which I shall for convenience call "agglomeration." As this agglomeration progresses during the aging, settling, centrifuging or other treatment of the precipitated protein, less and less benefit is derived from the addition thereto of my heavy metal salts. I therefore prefer to form an aqueous system, containing these salts and the protein, at some time prior to or during precipitation rather than after agglomeration of the precipitate has occurred. Addition of my heavy metal compound is not recommended after separating the protein from the liquor by filtration, centrifugation or otherwise.

The protein recovered after treatment with copper or mercury compounds according to my invention has a residual copper or mercury content, even after prolonged water-washing. While I believe that complexes between the protein and the cupric or mercuric ions are formed in the course of the process, I have not up to the present time been able to identify these with certainty and I do not wish to be bound by any particular theory as to their constitution or as to the mechanism whereby my heavy metal compounds produce the desired results.

Very small quantities of my heavy metal compounds suffice to improve solution properties of the protein. Larger quantities are to be avoided because they are wasteful, expensive, cause discoloration and may, if excessive in amount, even cause some precipitation of the protein. Usually from about 0.1 per cent to about 0.5 per cent of a gram-mol of the compound per 100 grams of recoverable protein suffices to accomplish my purpose, whereas four or five times this maximum amount is required before an appreciable amount of protein begins to be precipitated thereby from the alkaline solution of the protein. Some advantages in solution properties are obtainable with even less than 0.1 per cent of a gram-mol of heavy metal compound per 100 grams of recoverable protein, but in general at least 0.04 per cent of a gram-mol is required for appreciable benefit. Only rarely do amounts in excess of 0.8 per cent of a gram-mol have added advantage. The amount of recoverable protein in the alkaline extract, upon which the amount of added compound is based, can be estimated in advance, as for example by previous experience with the meal to be treated or by chemical analysis or by acidifying a portion of the alkaline extract to precipitate protein therefrom, centrifuging, and drying and weighing the resulting cake.

As previously stated, alkali metal sulfites, bisulfites, sulfurous acid or sulfur dioxide suppress bacterial growth in protein-containing liquors, but also make the recovered protein less readily soluble. Cupric and mercuric ions tend to counteract this latter effect, so that by properly balancing the quantities of sulfite, bisulfite, sulfurous acid or sulfur dioxide (or in general, any addition agent capable of furnishing sulfite ions in the solution) and of cupric or mercuric ions, protein may be obtained having any desired solution rate or viscosity within wide limits. Furthermore, although cupric and mercuric ions tend to discolor the protein, sulfite ions tend to oppose this discoloration, so that by properly balancing these ions, protein can be obtained of color suitable for many applications.

When the protein is to be subjected to the cooperative action of sulfite ions and of cupric or mercuric ions, consideration must be given to the stage in the protein-recovery process at which the protein is contacted with these ions. Irrespective of sulfite, cupric or mercuric ions are effective, as previously stated, when contacted with the protein at any time prior to isolation thereof from the acid solution in which it is precipitated, although they become less and less effective as agglomeration of the precipitated protein progresses, and hence are commonly used at some stage prior to precipitation or before completion of precipitation.

In the case of sulfite ions, other factors must be considered. For example, the treatment with sulfite ions should for convenience be such as to interfere as little as possible with the establishment of pH values adapted for dissolving or for precipitating the protein. Further, since one of the advantages in using sulfite ions is that they inhibit bacterial growth, such ions are preferably added at an early stage in the process, before precipitation of the protein or at least before extensive aging of the protein-containing liquor has occurred.

More specifically, sodium sulfite and other alkali metal sulfites, having an alkaline reaction, are normally added prior to precipitation of the protein lest they complicate the attainment and maintenance of the low pH required for said precipitation; however, they may if desired be added, with proper pH adjustment, at an time prior to separation of the protein. Similarly, sodium bisulfit, sulfurous acid or sulfur dioxide, being acid in reaction, may advantaeously be, or be contained in, or be added together with, the acidic agent which causes the precipitation; thus they are normally added prior to completion of precipitation of the protein, but they may if desired be added at any time prior to separating the protein, provided pH be suitably controlled as will be apparent to one skilled in the art.

The amount of sulfite ion to be furnished by sulfur dioxide or by alkali metal sulfite or bisulfite, in order to counteract effectively the discoloration of the protein by cupric or mercuric compounds, is related to the quantity of these heavy metal compounds used. In general, the molar concentration of the sulfite-ion-producing compound needed is at least three or four times that of the heavy metal compound. Thus usually at least 0.15 per cent of a gram-mol and preferably about 0.3 to about 3 or 4 per cent of a gram-mol of alkali metal sulfite or bisulfite is required per 100 grams of protein present, and in any case an amount sufficient to lessen the discoloration of the protein caused by the said heavy metal compound. In the case of gaseous sulfur dioxide, it is not possible to specify the minimum amount required, since this depends upon the means whereby the gas is contacted with the protein-containing system; sufficient amount should be used to lessen the discoloration caused by cupric or mercuric ions, and by experience one skilled in the art learns the amount required.

The following examples, in which all parts are by weight, illustrate my invention, but it will be understood that they are illustrative only and that the invention is not limited thereby but only by the claims appended hereto. In these examples, the substantially oil-free soybean flakes or meal contained approximately 40-44% alkali-soluble protein (the exact amount depending on the previous history of the meal), of which about four-fifths, or about one-third of the meal, is recoverable by precipitation in the range of pH 4.0-4.4. I shall herein refer to this as "recoverable protein." Reference is made in these examples to solution time and to viscosity determinations. Various methods can be used for determining these properties, but in the examples the procedures were as follows:

Solution time was determined by drying the recovered protein to a water content of 10 per cent or less, grinding and sieving the dried protein, and using a portion which passed through a 40 mesh sieve but not through a 100 mesh sieve. One gram of this powder was mixed with 3 grams of sodium carbonate and the dry mixture was added to 250 ml. of water at 120° F. in a 250 ml. glass cylinder, which was then closed and gently shaken until discrete particles of protein were no longer visible. The time required was recorded as "Solution Time."

Viscosity was determined by sieving the dried and ground protein to pass through a 40 mesh sieve, wetting 16 grams of this sieved protein with about 75 ml. of water at 25° C., adding 0.9 gram of sodium hydroxide (in case the protein is particularly hard to dissolve, larger amounts of NaOH are used, the amount of course being constant for any given group of comparisons) as a solution of known strength, making the mixture up to 100 g. with water, and agitating slowly at 25° C. for 45 minutes. The solution was then poured into a Hoeppler viscosimeter (i. e. a rolling ball type) and the viscosity was measured at 25° C. exactly one hour after adding the NaOH.

*Example 1.*—One hundred fifty parts of substantially oil-free soybean flakes were mixed with 2100 parts of water and enough sodium hydroxide to give a final pH of 8.5 at 120° F. After 30 minutes' extraction at 120° F., undissolved matter was screened out. To the protein-containing liquor, 0.5 part of $CuSO_4 \cdot H_2O$ (i. e. about 0.4% of a gram-mol per 100 grams of recoverable protein present) was added and the pH of the solution was reduced to approximately 4 at 110° F. by adding sulfuric acid of 10% strength, the protein being thereby precipitated. The resulting thin slurry was settled for 18 hours at 110° F. to a concentration of about 10% protein solids and the upper layer was decanted off and discarded. The remaining thickened slurry was filtered, dried, and tested in standardized manner for rate of solution in aqueous alkali. The solution time of the cooper-containing protein so prepared was 1.25 minutes, whereas a protein prepared similarly except for the absence of copper had a solution time of 2.5 minutes.

In a corresponding run, the $CuSO_4 \cdot 5H_2O$ was added to and dissolved in the precipitating acid. The solution time of the finished protein was in this case 1.5 minutes.

*Example 2.*—Soybean flakes were extracted with an oil-solvent until their residual oil content was less than 1% by weight. One hundred fifty parts of the extracted flakes were then mixed with about 14 times their weight of water containing enough sodium hydroxide to give a final pH of 8.3 when measured at 120° F. after 30 minutes' extraction. After the extraction period, the liquid was clarified by screening and centrifuging. To the screened protein-containing liquor, 0.25 part of $CuSO_4$ (i. e. about 0.3% of a gram-mol per 100 grams of recoverable protein present) was added. The protein was then precipitated by adding sulfuric acid thereto until the pH at 110° F. was about 4.0. The resulting thin slurry was settled for 18 hours at 110° F., the upper layer of clear liquor was siphoned off, the thickened slurry was filtered, and the filter cake was granulated, dried, ground and sieved.

In another run, corresponding otherwise, 0.5 part of mercuric acetate (i. e. about 0.3% of a gram-mol per 100 grams of recoverable protein present) was substituted for the $CuSO_4$. In a third run, corresponding otherwise, neither copper nor mercury salts were used.

Viscosity determinations on the three samples of recovered protein and colors were:

| Heavy metal salt used | Color | Viscosity (centipoises) |
| --- | --- | --- |
| Mercuric Acetate | Brown | 284 |
| Copper Sulfate | Greenish Tan | 2,850 |
| None (Blank) | Tan | >25,00 |

*Example 3.*—This example illustrates the cooperative action of my heavy metal salts in reducing solution time and viscosity, and of alkali metal sulfites in neutralizing the discoloration produced by the said heavy metal salts. It also illustrates the effect of varying amounts of heavy metal salt and of sulfite.

In each of a series of runs, 100 parts of solvent-extracted soybean meal containing 9% water and approximately one third recoverable protein by weight were slurred in 1400 parts of water at 120° F. When sodium sulfite was used, it was dissolved in the water before adding the meal. Sufficient sodium hydroxide was added to give a final pH of 8.5. The slurry was agitated slowly for 30 minutes at 120° F. and was then screened through a 100 mesh screen, the insoluble meal being discarded. A solution of cupric sulfate was then mixed in varying amounts with the protein-containing liquor, from which the protein was next precipitated by adjusting the liquor with a 7.5% $H_2SO_4$ solution to a pH of 4.4. The slurry was allowed to settle overnight and was decanted to about half its original volume, whereupon in order to render it more readily filterable a solution of $Al_2(SO_4)_3 \cdot 18H_2O$ in water was added, the amount of aluminum salt being about 4% by weight of the protein present in solution. After 15 minutes' mixing the slurry was filtered under suction. The resulting cake was granulated and dried to about 10% $H_2O$ in a forced draft oven at 120° F. inlet temperature. The dried protein was then ground to pass a 40 mesh screen, and was examined for rate of solution, viscosity and color, with the following results:

Table I

| $CuSO_4 \cdot 5H_2O$ | | $Na_2SO_3$— g./100 g. of meal | Sol'n Time [1] | Viscosity [2] | Color |
|---|---|---|---|---|---|
| g./100 g. of meal | gram-mols/ 100 g. of recoverable protein | | | | |
| 0 | 0 | 0 | 2.50 | 12,120 | Red Tan. |
| 0.042 | 0.05 | 0 | 2.0 | 1,355 | Dark Tan. |
| .083 | .10 | 0 | 2.0 | 1,760 | Olive Tan |
| .167 | .20 | 0 | 2.0 | [3] 7,400 | Dull Green. |
| .333 | .40 | 0 | 1.75 | 807 | Deep Green. |
| 0 | 0 | 0.5 | 4.75 | Near Gel | Tan. |
| 0.042 | 0.05 | 0.5 | 4.75 | Near Gel | Do. |
| .083 | .10 | 0.5 | 4.0 | Very High | Do. |
| .167 | .20 | 0.5 | 2.75 | 4,190 | Dull Green. |
| .333 | .40 | 0.5 | 1.25 | 812 | Dull Tan. |
| 0 | 0 | 2.0 | 7.0 | Incomplete Sol'n | Tan. |
| 0.042 | 0.05 | 2.0 | 6.5 | 8,000 | Do. |
| .083 | .10 | 2.0 | 4.75 | 7,120 | Light Tan. |
| .167 | .20 | 2.0 | 2.75 | 6,940 | Tan. |
| .333 | .40 | 2.0 | 2.0 | 1,025 | Tan and slight green. |

[1] Minutes at 120° F.
[2] Centipoises at 25° C.
[3] This value is believed to be incorrect due either to experimental error or to a clinical error in recording.

*Example 4.*—This example illustrates various stages in the protein recovery process at which the protein may be treated with cupric or mercuric salts. Four runs were made as follows:

In the first run, 1.5 parts of $Na_2SO_3$ and 0.5 part of $CuSO_4 \cdot 5H_2O$ were dissolved in 2100 parts of water at 120° F., and into this there were mixed 150 parts of substantially oil-free soybean meal. Sodium hydroxide was added to bring the pH to 8.5 and the slurry was agitated for 30 minutes at 120° F. Insoluble meal and other impurities were screened out and dissolved protein was precipitated from the screened extract by acidifying with $H_2SO_4$ to pH 4.4. After settling overnight, the supernatant liquid was decanted off and to the concentrated slurry 6 parts of a 20% (by weight) solution of $Al_2(SO_4)_3 \cdot 18H_2O$ were added, in order to accelerate subsequent filtration. The slurry was mixed vigorously by circulating through a gear pump and then by 5 minutes' further gentle agitation, following which it was filtered under suction, granulated, dried and ground.

In a second run, corresponding otherwise, the $CuSO_4 \cdot 5H_2O$ was added to the screened extract, containing dissolved protein, just before same was precipitated with $H_2SO_4$.

In a third run, corresponding otherwise, the $CuSO_4 \cdot 5H_2O$ was added to the freshly precipitated protein slurry, before settling same.

In a fourth run, corresponding otherwise, the $CuSO_4 \cdot 5H_2O$ was omitted entirely.

The following observations were made upon the protein samples recovered in these runs:

$CuSO_4 \cdot 5H_2O$ added:

Solution time (minutes)

To water before extracting protein ____ 2.0
To screened alkaline solution of protein_ 2.0
To acidified protein slurry _____ 2.0
Blank (no $CuSO_4$) _____ 4.0

*Example 5.*—Substantially oil-free soybean flakes were slurried with 14 times their weight of water containing 1% of their weight of sodium sulfite, and enough sodium hydroxide was added to give a final pH, after agitating 30 minutes at 120° F., of 8.6. The slurry was screened to remove insoluble material, and the extract, containing dissolved protein, was divided into three batches, each representing 150 parts of the original flakes. To the first batch 0.1 part of mercuric bromide (i. e. about 0.055% of a gram-mol per 100 grams of recoverable protein present) was added, with stirring; to the second, 1.0 part of mercuric bromide was added, with stirring; to the third batch, nothing was added. Each batch was then precipitated by adding sulfuric acid of 7.5% strength to reduce the pH to 4.4. After settling overnight the supernatant liquor was decanted, leaving a thickened slurry of about half the original volume. To each batch of slurry there was added, with agitation, 6 parts of a 20% by weight solution of $Al_2(SO_4)_3 \cdot 18H_2O$ to improve filtration. The slurries were then filtered under suction and the cakes were granulated, dried at 120° F. and ground. Solution times were:

Sol'n time, min.

0.1 part $HgBr_2$ per 150 parts soybean flakes_ 3.25
1.0 part $HgBr_2$ per 150 parts soybean flakes_ 2.00
Blank _____ 5.5

*Example 6.*—The process of this example was similar to Example 5 in all respects except that after dividing into three batches, each representing 150 parts of the original flakes, instead of adding mercuric bromide, 1.0 part of cupric nitrate was added to the first batch and 1.0 part of cupric chloride was added to the second batch. (These amounts were larger than necessary and correspond respectively to about 1% and 1.5% of a gram-mol of the salt per 100 grams of recoverable protein present.) The third batch, as before, was a blank to which nothing was added. The recovered protein, after drying and grinding, exhibited the following solution times:

Solution time, min.

1 part $Cu(NO_3)_2$ per 150 parts soybean flakes_ 2.0
1 part $CuCl_2$ per 150 parts soybean flakes____ 2.0
Blank _____ 4.0

*Example 7.*—This example illustrates the use of a very slightly soluble copper compound in treating soybean protein. Protein was extracted from substantially oil-free soybean meal as described in Example 5. After screening out the alkali-insoluble matter, the alkaline extract was divided into two batches each representing 150 parts of original flakes. To one of these, 0.5 part of cupric hydroxide was added, stirring briskly to break up lumps. To the other portion, nothing was added. Protein was precipitated from the two batches with acid and was recovered as in Example 5. Solution times were:

Solution time, min.
Sample treated with Cu(OH)$_2$ _____ 3.75
Blank _____ 4.5

*Example 8.*—This example illustrates the use of soluble cupric or mercuric salts in a protein recovery process which involves partial alkali-hydrolysis of the protein. Three runs were made as follows:

In the first run, 150 parts of substantially oil-free soybean meal were added to 2100 parts of water containing 1.5 parts of sodium sulfite, and enough sodium hydroxide was added to bring the final pH to 8.5 at 120° F. The mixture was agitated for 30 minutes at 120° F. and was then passed through a 100 mesh screen, the insoluble meal being discarded. To the screened extract, containing dissolved protein, 0.5 part of CuSO$_4$·5H$_2$O was added. This was followed by the addition of 3.75 parts of sodium hydroxide to bring the pH above 10. The solution was held for 2 hours at 110°±5° F. in order to partially hydrolyze the protein, and was then acidified with dilute H$_2$SO$_4$ to a pH of 4.4, thereby precipitating the protein. The resulting slurry was concentrated by settling overnight and drawing off the supernatant liquor. To this thickened slurry, 6 parts of a 20% by weight solution of $$Al_2(SO_4)_3 \cdot 18H_2O$$

were added, with agitation. The slurry was then filtered, granulated, dried and ground.

In a second run, corresponding otherwise, the CuSO$_4$·5H$_2$O was added to the strongly alkaline solution at the end of the hydrolysis period, just before precipitating with acid.

In a third run, corresponding otherwise, no CuSO$_4$ was added, this being a blank.

Examination of the resulting protein samples showed:

CuSO$_4$·5H$_2$O added:

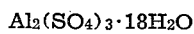

Viscosity (centipoises)
 To protein solution before hydrolysis
  alkali _____ [1] 154
 To protein solution after hydrolysis____ 200
 Blank (no CuSO$_4$) _____ 243

[1] The viscosity here shown would have been lower had the pH of the solution after adding CuSO$_4$ been readjusted to its original value, i. e. 8.5.

*Example 9.*—This example illustrates the use of my heavy metal salts in a protein-recovery process which involves both partial hydrolysis of the protein under the influence of alkali and a purification in known manner with lime. The procedure was as follows:

Protein was extracted from 150 parts of substantially oil-free soybean flakes as described in Example 8, using an alkaline solution of pH 8.5 at 120° F. After screening out insoluble matter, the pH was raised to above 10 by adding 3.75 parts of sodium hydroxide and 5.0 parts of calcium hydroxide as a slurry in water. The mixture was held at 110°±5° F. for 1.5 hours to hydrolyze the protein and to effect purification with lime, and insoluble matter was then centrifuged out and discarded. To the alkaline protein solution, 0.5 part CuSO$_4$·5H$_2$O was added and the protein was precipitated by adding acid to a pH of 4.4. Further treatment was similar to that described in Example 8. A corresponding blank was run with no CuSO$_4$. Results:

| CuSO$_4$·5H$_2$O added— | Solution Time (minutes) | Viscosity (centipoises) |
|---|---|---|
| To the hydrolized alkaline solution | 1.75 | 147 |
| Blank (No CuSO$_4$) | 2.0 | 700 |

In the above example the amount of lime can be varied widely but for best results it should in general be about 5% or more by weight of the protein present.

*Example 10.*—This example illustrates the use of my heavy metal salts in a protein-recovery process which involves treatment with lime at high pH but without prolonged hydrolysis. The procedure was the same as that of Example 9 except that after adding alkali and lime the mixture was immediately centrifuged to remove insoluble matter and immediately acidified to precipitate the protein, whereas in Example 9 it stood for 1.5 hours at 110°±5° F. before centrifuging and acidifying. Results:

| CuSO$_4$·5H$_2$O added— | Solution Time (minutes) | Viscosity [1] (centipoises) |
|---|---|---|
| To alkaline solution before acidifying | 3.0 | 284 |
| Blank (No CuSO$_4$) | 4.5 | 376 |

[1] Viscosity determinations were made on 13.3% protein solutions containing 1.0% NaOH.

While soybean protein has been referred to in the preceding discussion, it will be understood that my process can be used in the recovery of protein from oleaginous seed materials in general, such for example as peanuts, cottonseed, linseed, and the like. Substantially all of the oil is preferably removed from the flake or meal before it is subjected to the protein recovery process. Any suitable means, such for example as expression, may be used for this purpose but solvent-extraction is commonly preferred because it gives higher yields of protein and leaves the protein relatively unharmed by heat. By this method the oil content of the meal may easily be reduced to not more than 1 per cent or 2 per cent of the weight of the meal.

The steps wherein the protein is extracted from substantially oil-free seed material are not part of the instant invention, conventional protein solvents and conditions being employed. Thus I can employ suitable concentrations of aqueous solutions of agents commonly used for the purpose, such as sodium hydroxides, potassium hydroxide, calcium hydroxide, amines such as triethylamine and the mono-, di- and triethanolamines, or alkaline salts such as sodium carbonate, sodium sulfite or borax. I can also employ salt solutions such as sodium chloride, sodium sulfate and calcium chloride, adjusting the pH value to the desired point with alkali. The conditions of the extraction, such as temperature, time, concentration of reagents, etc., can be varied considerably without materially affecting the characteristics of the end product, particularly if several factors are varied simultaneously in such manner as to minimize such effect, as will be understood by one skilled in the art. In general, however, I prefer to extract the protein at relatively low temperature, such as about 115° to 125° F.; if high temperatures are reached in processing the seed or the protein, partial denaturing of the protein may occur and its solubility be decreased. Although extraction of the protein can be carried out at any pH above its isoelectric point, satisfactory yields require a pH of at least 6, and in general I prefer to extract at a pH of 8 or 9.

Protein can be precipitated from alkaline solution by adding any suitable acid-reacting agent until the pH is reduced to about 3.6 to 4.5. Mineral acids such as hydrochloric, sulfuric or nitric acids, acid salts such as sodium acid sulfate or sodium bisulfite, or acid-forming gases such as sulfur dioxide or sulfur trioxide can be used for the purpose.

Having thus described my invention, what I claim and desire to secure by Letters Patent is:

1. In a method of recovering protein of improved solution properties from oleaginous seed material by the process of treating the material with a protein solvent at a pH not less than 6, precipitating the dissolved protein with acid, and separating the protein from the acidulated solution, the step of introducing during the recovery process and prior to separation of the protein from the solution, at least one member of the group consisting of acid-soluble cupric and mercuric compounds in an amount insufficient to precipitate protein from an aqueous alkaline solution thereof but equal to at least 0.04 per cent of a gram-mol of the compound per 100 grams of recoverable protein present and sufficient to improve the solution properties of the recovered protein in aqueous alkaline media.

2. In a method of recovering protein of improved solution properties from soybean material by the process of treating the material with a protein solvent at a pH not less than 6, precipitating the dissolved protein with acid, and separating the protein from the acidulated solution, the step of introducing, during the recovering process and prior to separation of the protein from the solution, at least one heavy metal compound of the group consisting if acid-soluble cupric and mercuric compounds in an amount equal to from about 0.04 per cent to 0.8 per cent of a gram-mol of the compound per 100 grams of recoverable protein present and sufficient to improve the solution properties of the recovered protein in aqueous alkaline media.

3. The process of claim 2 wherein the heavy metal compound is a water-soluble cupric salt.

4. The process of claim 2 wherein the heavy metal compound is cupric sulfate.

5. The process of claim 2 wherein the heavy metal compound is cupric chloride.

6. The process of claim 2 wherein the heavy metal compound is a water-soluble mercuric salt.

7. The process of claim 2 wherein the heavy metal compound is mercuric acetate.

8. In a method of recovering protein of improved solution properties from oleaginous seed material by the process of treating the material with a protein solvent at a pH not less than 6, precipitating the dissolved protein with acid, and separating the protein from the acidified solution, the step of introducing, during the recovery process and prior to separation of the protein from the solution, ions of the group of ions consisting of cupric and mercuric ions and mixtures thereof, in an amount sufficient to improve the solution properties of the recovered protein in aqueous alkaline solution but insufficient to precipitate protein therein.

9. In a method of recovering protein of improved solution properties from soybean material by the process of treating the material with a protein solvent at a pH not less than 6, precipitating the dissolved protein with acid, and separating the protein from the acidulated solution, the step of introducing, during the recovering process and prior to separation of the protein from solution, at least one heavy metal compound of the group consisting of acid-soluble cupric and mercuric compounds in an amount equal to from about 0.04 per cent to about 2 per cent of a gram-mol of the compound per 100 grams of recoverable protein present and sufficient to improve the solution properties of the recovered protein in aqueous alkaline medium but insufficient to precipitate protein from an aqueous alkaline solution thereof.

10. The process of claim 2 wherein the heavy metal compound is introduced in an amount equal to from about 0.1% to about 0.5% of a gram-mol of the compound per 100 grams of recoverable protein present.

11. In a method of recovering protein of improved solution properties from soybean material by the process of treating the material with a protein solvent at a pH not less than 6, said solvent containing at least 0.15 per cent of a gram-mol of a sulfite-ion producing compound per 100 grams of recoverable protein present and sufficient to improve the color of the recovered protein, precipitating the protein with acid, and separating the protein from the acidulated solution, the step of introducing at any time prior to precipitation of the protein at least one member of the group consisting of acid-soluble cupric and mercuric compounds in an amount no greater than about one-third by weight of the sulfite-ion-producing compound and sufficient to improve the solution properties of the recovered protein in aqueous alkaline media but insufficient to precipitate protein from an aqueous alkaline solution thereof.

STEWART ROWE.

REFERENCES CITED

The following references are of record in the file of this patent:

UNITED STATES PATENTS

| Number | Name | Date |
|---|---|---|
| 1,755,531 | Beaufour | Apr. 22, 1930 |
| 1,866,698 | Bronsztajn | July 12, 1932 |
| 2,194,835 | Nickerson | Mar. 26, 1940 |
| 2,274,004 | Shildneck | Feb. 24, 1942 |

OTHER REFERENCES

Burnett et al.: Ind. and Eng. Chem., vol. 37, pp. 276–281 (1945).